US012544283B2

(12) United States Patent
Hancock

(10) Patent No.: US 12,544,283 B2
(45) Date of Patent: Feb. 10, 2026

(54) POWERED SEAT FOR CHAIRS

(71) Applicant: Maurice Hancock, Downs, KS (US)

(72) Inventor: Maurice Hancock, Downs, KS (US)

( * ) Notice: Subject to any disclaimer, the term of this patent is extended or adjusted under 35 U.S.C. 154(b) by 179 days.

(21) Appl. No.: 18/397,355

(22) Filed: Dec. 27, 2023

(65) Prior Publication Data

US 2024/0207117 A1 Jun. 27, 2024

Related U.S. Application Data

(60) Provisional application No. 63/435,397, filed on Dec. 27, 2022.

(51) Int. Cl.
*A61G 5/00* (2006.01)

(52) U.S. Cl.
CPC ...................................... *A61G 5/00* (2013.01)

(58) Field of Classification Search
CPC ........... A61G 5/00; A47C 1/025; B60N 2/213
USPC ................................. 297/362, 362.1, 362.11
See application file for complete search history.

(56) References Cited

U.S. PATENT DOCUMENTS

| | | | | | |
|---|---|---|---|---|---|
| 1,158,612 | A * | 11/1915 | Wiesenfeld | B61D 33/0028 | 297/283.1 |
| 2,937,641 | A * | 5/1960 | Oetinger | A47C 1/143 | 297/89 |
| 5,294,179 | A * | 3/1994 | Rudes | A61G 5/14 | 297/DIG. 10 |
| 6,000,757 | A * | 12/1999 | Sovis | B60N 2/23 | 297/354.12 |
| 6,227,619 | B1 * | 5/2001 | Pesta | B60N 2/01591 | 297/378.12 |
| 8,622,473 | B2 * | 1/2014 | Walsh | A47C 3/029 | 297/451.3 |
| 11,622,629 | B2 * | 4/2023 | LaPointe | A47C 1/0345 | 297/362.11 |
| 2004/0212236 | A1 * | 10/2004 | Hale | A61G 5/14 | 297/325 |
| 2010/0022926 | A1 * | 1/2010 | Kramer | A47C 7/506 | 297/217.6 |
| 2014/0138995 | A1 * | 5/2014 | Leib | A61H 3/008 | 297/283.2 |
| 2015/0230608 | A1 * | 8/2015 | Unwalla | A47C 1/03255 | 297/325 |
| 2015/0374566 | A1 * | 12/2015 | Robertson | A47C 1/032 | 29/434 |

* cited by examiner

*Primary Examiner* — Jose V Chen
(74) *Attorney, Agent, or Firm* — Law Office of Julie Scott LLC

(57) ABSTRACT

The present invention provides powered seats for chairs such as recliners or lift chairs that can move a seated user either forward or back in the chair. The invention is particularly useful for individuals lacking sufficient strength or mobility to move from the front of a chair seat to the back of the chair seat, or alternatively from the back of the chair to the front of the chair, without the assistance of one or more persons. The invention also allows a user to adjust their position in a chair to any spot between the front and back of the chair's seat as desired.

17 Claims, 6 Drawing Sheets

POWERED SEAT FOR CHAIRS

REFERENCE TO RELATED PATENTS

This application claims the benefit of U.S. Provisional Patent Application No. 63/435,397 that was filed Dec. 27, 2022.

FIELD OF THE INVENTION

The present invention relates to powered seats for chairs such as lounge chairs, recliners, or lift chairs, as well as the associated methods of manufacture and assembly kits.

BACKGROUND OF THE INVENTION

Individuals lacking sufficient body strength or mobility often have difficulty moving from the front of a chair seat to the back of the chair seat. Sometimes they require the assistance of two people, one on each side, to move them back in the chair so that their back is supported. Such assistance is not always available, which leaves the individual in an uncomfortable and unsupported, or insufficiently supported, position that may result in back or other injury. Additionally, even if an individual was initially moved to a supported position in a chair, they may move incrementally forward or sideways in the chair so that they are no longer supported by the chair's back. Again, the individual is left in an uncomfortable and potentially injurious position from which assistance is needed to move them back to a supported position.

Similarly, individuals lacking sufficient body strength or mobility often have difficulty moving from the back of the chair to the front of chair so that they can either rise, sit at a table, or otherwise take an action that requires or is better suited for the individual to be seated at the front of the chair.

SUMMARY OF THE INVENTION

The present invention provides solutions for these problems. Advantageously, the invention allows the user to move themselves without the assistance of another person from the front area of a seat to the back area of the seat or from the back area of the seat to the front area of the seat or any area between the front and back of the seat. Alternatively, a single caregiver can move the user forward or back in the chair without having to manually lift the user or requiring the assistance of a second person to lift the user.

The invention allows a user to have greater control over their seated position and to adjust their position as desired. For example, a user may wish to move forward in a chair to perform a particular action and then move back in the chair so that they are supported by the chair back. Such control is deemed to be advantageous, especially by those individuals in long-term care that often lack as much control over their surroundings and daily lives as they may have previously exerted.

The invention is suitable for use in a variety of chairs including those having a footrest or a back that can recline.

The invention provides a powered seat that comprises a seat component that includes a roller assembly, a conveyor belt, and padding. The roller assembly includes two drive rollers (i.e a first drive roller and a second drive roller), a roller axle, a neutral roller, a tension adjustment roller, a first chain sprocket, a second chain sprocket, a drive chain, and a motor. The roller assembly is supported by two framing supports. Each framing support includes an adjustable mount and a side mount that has multiple openings. The invention further includes at least two connectors for a chair, a power source, and a controller. The power source is a battery or an electrical cord, and it is operated by the controller. Preferably, the power source is incorporated into the motor. Suitable motors are known and commercially available.

In some embodiments, the invention includes a frame. The frame includes two or more support brackets and at least two cross braces. The frame can further include two or more, preferably four, legs. The frame can also include at least one back member, more preferably two back members. When the invention is installed in a chair the back member(s) is in contact with the back of the chair, and preferably the back member(s) is(are) attached to the chair. In chairs that can recline, preferred back members include a hinge or spring that allows the chair to recline and still allow a user to sit in the chair.

Preferably, the padding has a cover. Preferred covers are removable. Similarly, the padding may be removable.

Preferred powered seats of the invention include two or more roller bearings, a main frame, a motor mount, and a motor mount adjustment plate. These embodiments of the invention can include a slide plate, two or more springs, and two or more suitable fasteners.

The invention also provides methods of assembling a powered seat for a chair. Those of skill in the art will recognize that the powered seats of the invention can be assembled in more than one way, that is, there is not a particular order to the assembly steps that are described herein. Skilled artisans will appreciate that a chair's existing seat would need to be removed and the chair may need to be modified prior to the installation of the invention.

To assemble a powered seat of the invention, a roller assembly is fabricated. The roller assembly includes two drive rollers, a roller axle, a neutral roller, a tension adjustment roller, a first chain sprocket, a second chain sprocket, a drive chain, and a motor. The two drive rollers and the first chain sprocket are mounted onto the roller axle such that the drive rollers are spaced apart from each other, the first chain sprocket is between the drive rollers. The drive chain engages with the first chain sprocket and loops around the roller axle and also engages with the second chain sprocket that is attached to the motor.

A framing support is attached to each lateral side of the roller assembly. Each framing support includes an adjustable mount and a side mount that has multiple openings. Each adjustable mount is attached to the proximal end of the tension adjustment roller and the proximal side mount, and each side mount is also attached to the proximal end of the nearest drive roller and the proximal end of the neutral roller. The multiple openings in the side mount allow for size and tension adjustments when installing the powered seat into a chair.

A seat component is fabricated. The seat component includes the roller assembly that is attached to the framing support, a conveyor belt, padding, and a cover. The cover encloses the padding; the padding encircles the conveyor belt; and the conveyor belt encircles (wraps around) the roller assembly.

A connector is attached to each interior, lateral side of a chair and to a corresponding lateral side of the seat component. A power source is attached to the seat either directly or through the chair. The power source is operated by a controller. The controller may be a switch, remote control, or other suitable device.

In some embodiments, assembling a power seat of the invention further includes assembling a frame that includes two or more support brackets and at least two cross braces, and attaching the frame to the seat component and connectors. The frame can include two or more legs, preferably four legs, and a back member, more preferably two back members. If the power seat is to be installed into a reclining chair, then it is preferred that the back member(s) includes a hinge or spring such that the chair can recline after the invention is installed.

The invention also provides kits that include a powered seat that can be installed into an existing chair. Such kits can include multiple types of connectors to attach the powered seat to a variety of chairs.

BRIEF DESCRIPTION OF DRAWINGS

The following drawings form part of the present specification and are included to further demonstrate certain aspects of the invention. The invention may be better understood by reference to one or more of these drawings in combination with the detailed description presented herein. Unless specifically noted, articles depicted in the drawings are not necessarily drawn to scale.

DETAILED DESCRIPTION

The invention provides systems, kits, and methods that allow a user to adjust their seated position in a chair without needing the assistance of another person or persons.

Figure 1:
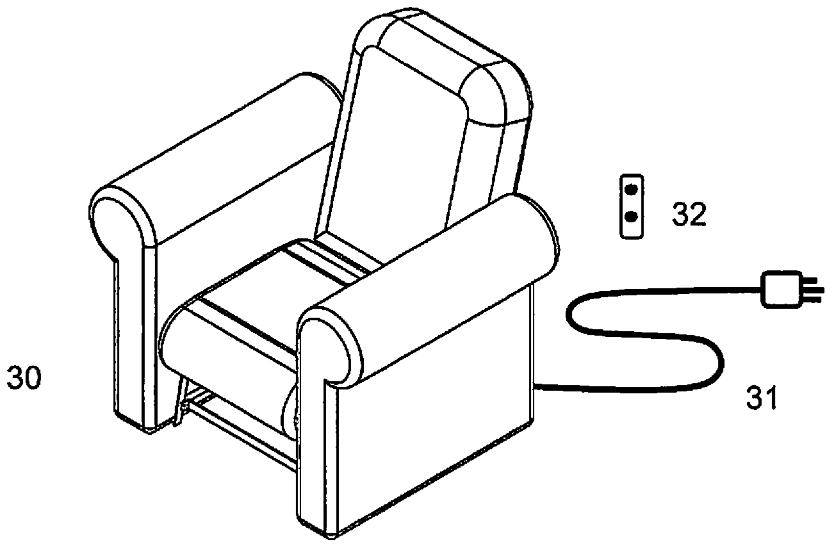
FIG. 1 illustrates an exemplary chair with a powered seat of the invention.

A chair 30 with an exemplary embodiment of the invention installed in it is illustrated in FIG. 1. Those of skill in the art will appreciate that the power source 31 may be either through an electrical cord or a battery. The chosen power source 31 will depend upon several factors such as the type of motor used and the placement and type of chair in which the invention is installed.

Preferably the invention is controlled by using a remote controller 32. Alternatively, the controller may be attached to the chair as a switch(es), button(s), or other means of control that are known in the art. The choice of the type of controller will, in part, depend upon user preferences and physical abilities.

Figure 2:
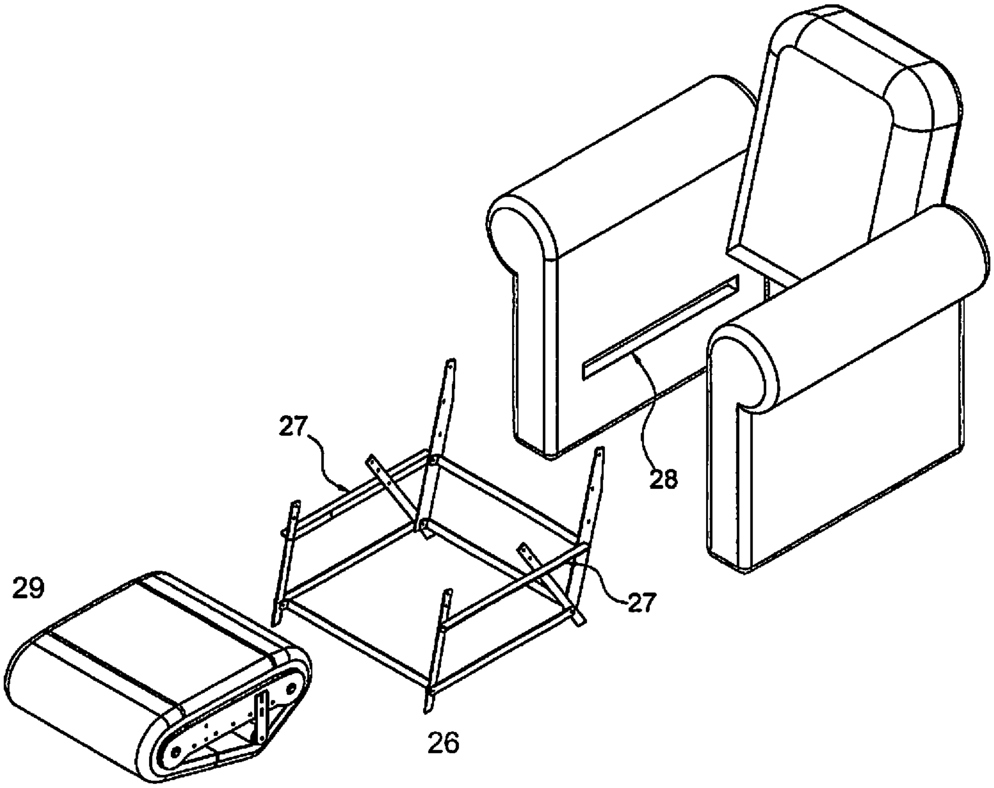
FIG. 2 shows the major components of the invention separated from each other prior to assembly.
Figure 3:
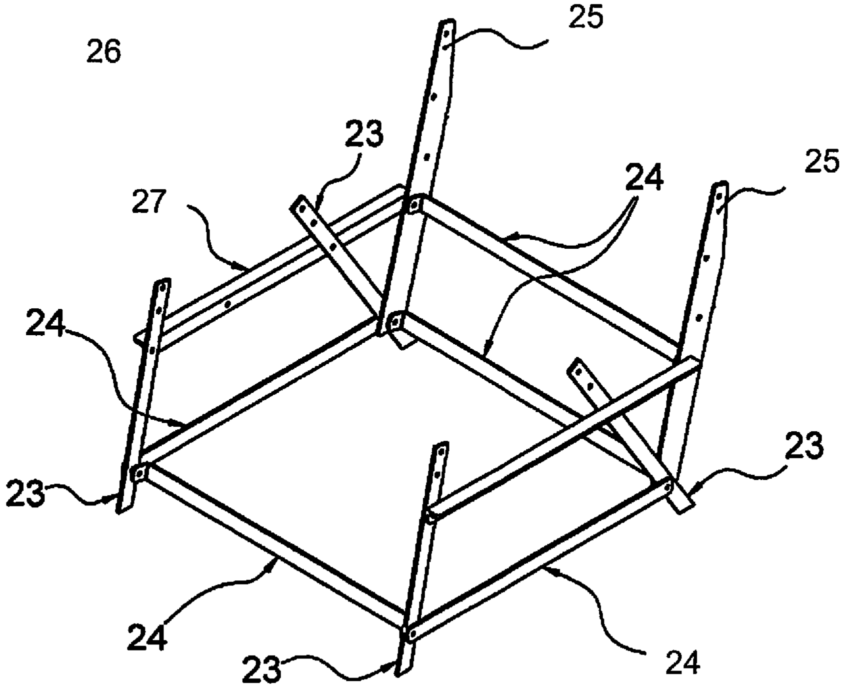
FIG. 3 illustrates a front-side perspective view of an exemplary frame.
Figure 4:
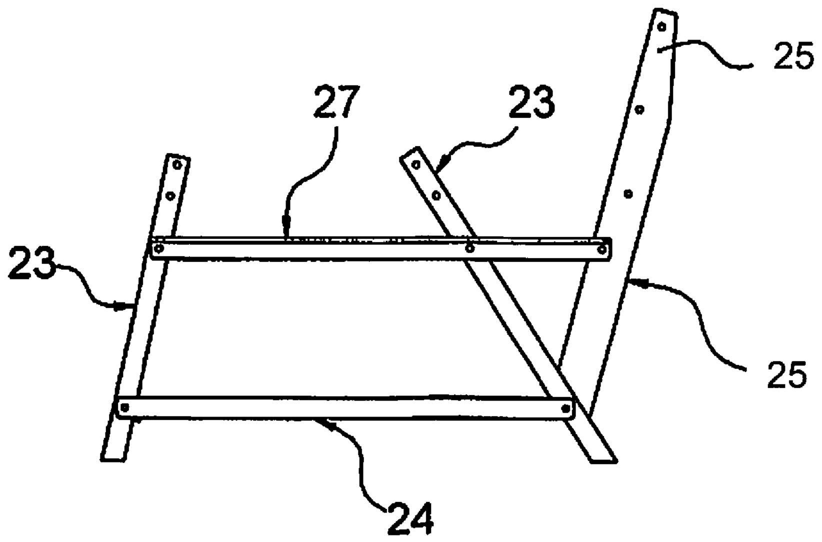
FIG. 4 is a side view of an exemplary frame.
Figure 5:
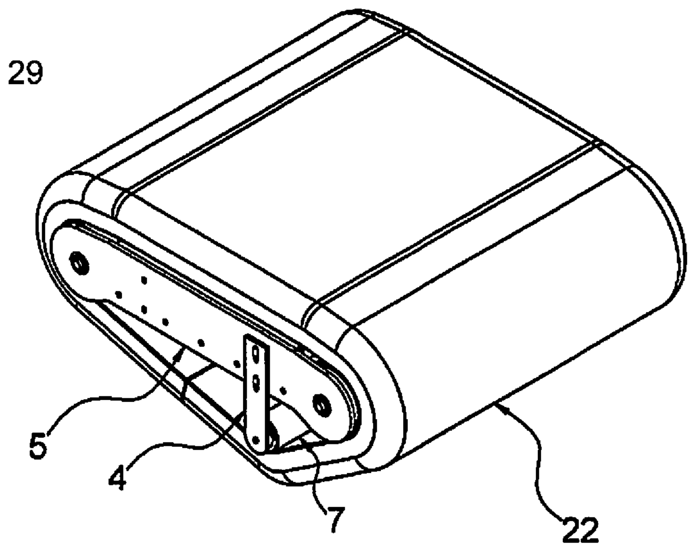
FIG. 5 is a front and side perspective view of a seat component of the invention.
Figure 6:
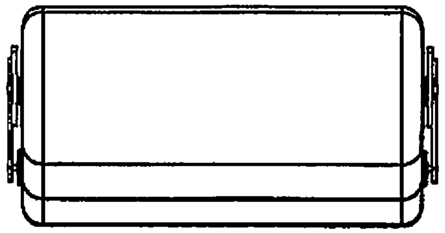
FIG. 6 a front view of the seat component of the invention.
Figure 7:
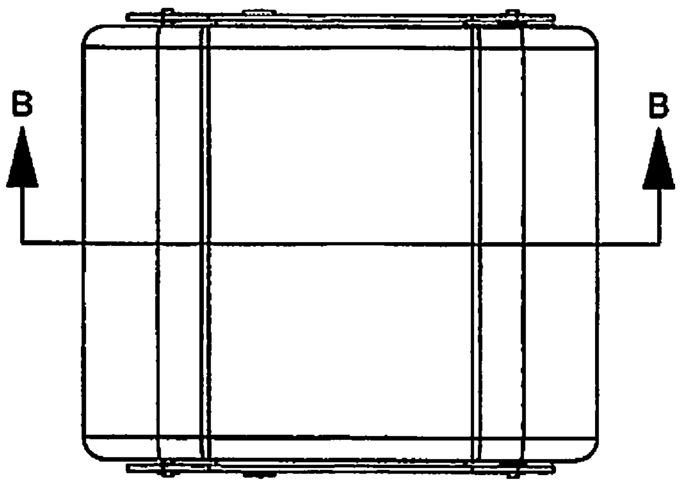
FIG. 7 indicates cross-section BB of the seat component that is shown in FIG. 8.
Figure 8:
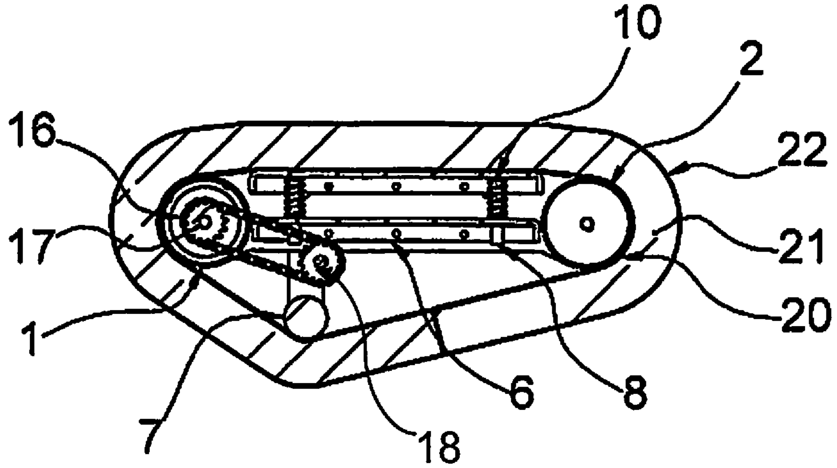
FIG. 8 is the cross-section view BB indicated in FIG. 7.
Figure 9:
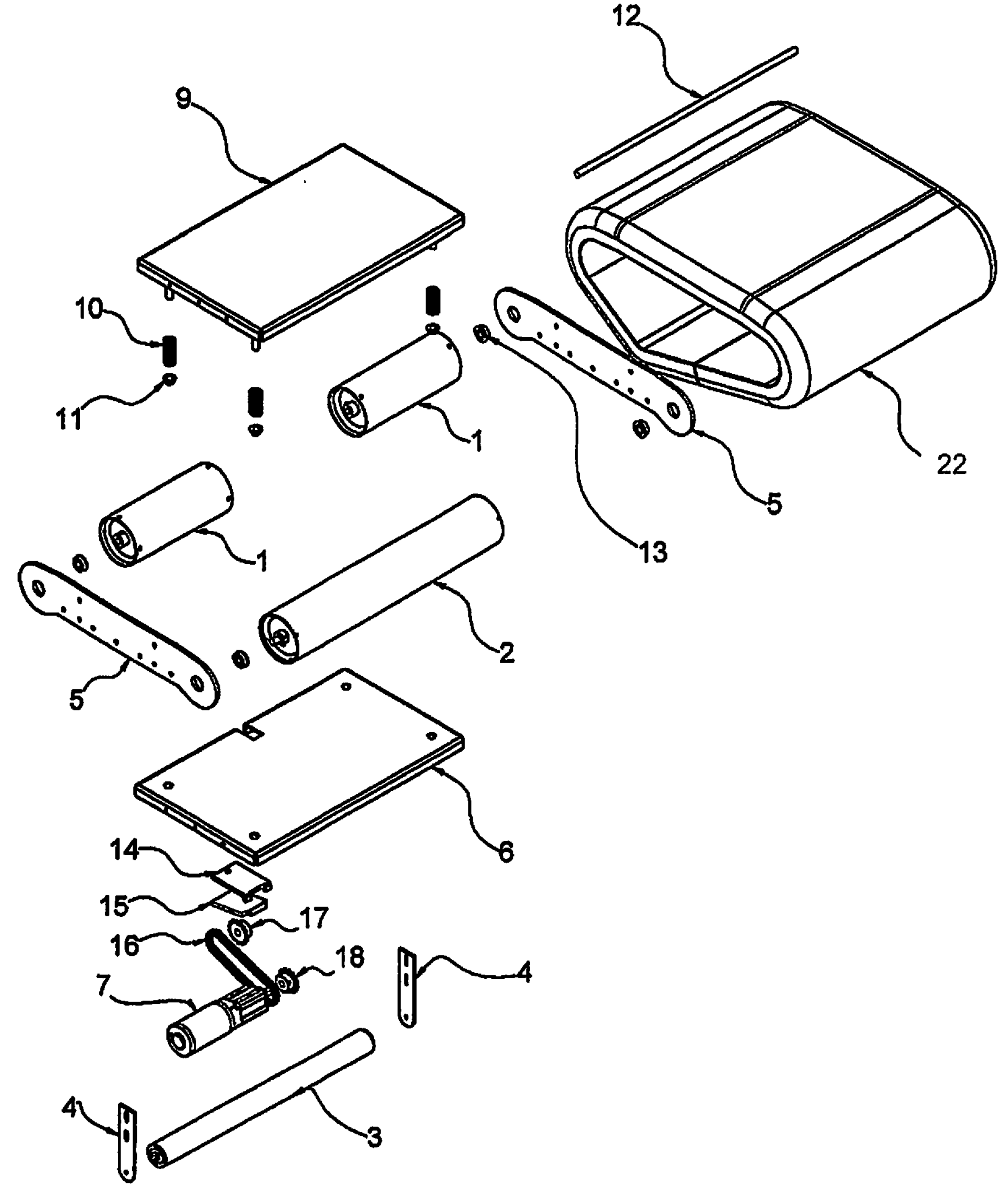
FIG. 9 is an exploded view of the seat component of the invention.
Figure 10:
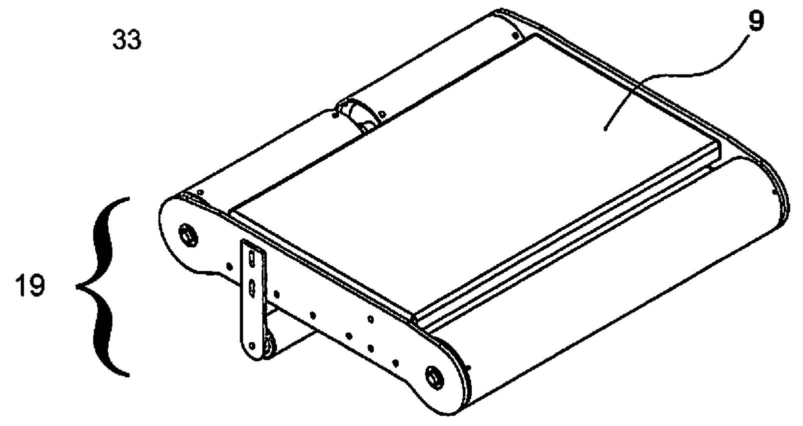
FIG. 10 illustrates a perspective view of the roller assembly from the side and above.
Figure 11:
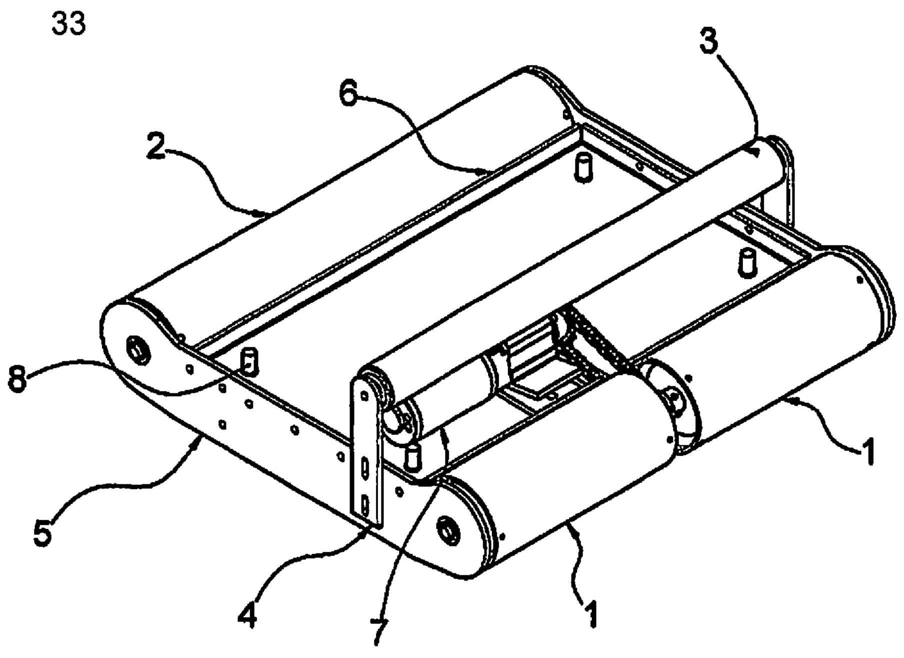
FIG. 11 illustrates a perspective view of the roller assembly from the side and below.

It will be appreciated that the invention can be installed in a pre-existing chair by modifying it. An exemplary modification is illustrated in FIG. 2. Skilled artisans will appreciate that alternative modifications can be used to install the invention and achieve a similar result. The illustrated embodiment is one that the inventor has found effective. Specifically, a chair 30 is modified to include a connector 28 on the interior of each lateral side of the chair. The connector 28 may be a slot, groove, shelf, bracket, or other unit that can be attached to the chair and to the frame 26 of the invention. In the exemplary embodiment illustrated in FIGS. 2-4, the frame 26 includes a lateral support bracket 27 on each side that attaches to the corresponding connector 28. Skilled artisans will appreciate that the support brackets 27 and connectors 28 may be attached to each other by a variety of suitable means that are known in the arts.

The frame 26 can be constructed in a variety of ways that will function in the invention. Preferably, the frame 26 consists of a sufficient number of legs 23 and cross braces 24 to stand by itself so that it can be more easily attached to a chair and a seat component 29. It is preferred that the frame 26 includes a back member 25 at the rear of each of its sides. A preferred member 25 is generally vertical and includes multiple openings through which fasteners can be used to secure the frame 26 to either the back or rear area of the chair 30. The shape, size, and relative verticality of the member 25 will vary with the type of chair 30 that is to be modified. In chairs having a back that reclines, preferred back members 25 include a hinge or spring (not shown) that allows the chair to recline.

Similarly, the shapes, sizes, and number of legs 23 and cross braces 24 may be varied with the type of chair to which the invention is to be attached. Preferred legs 23 and cross braces 24 include sufficient openings so that the size and configuration of the frame 26 is adjustable. A variety of suitable fasteners to attach the legs and braces to each other are known in the arts.

An alternative frame 26 (not shown) does not include legs. Rather, the alternative frame includes sufficient cross braces 24 so that the support brackets 27 can attach to the chair's connectors 28 and support the seat component 29 and the user. The type of frame that is selected will depend, at least in part, upon the type of chair to which the invention is to be installed, user(s) weight(s), and user(s) preferences.

The seat component 29 of the invention comprises a roller assembly 33, conveyor belt 20, and padding 21 that are connected to each other by framing supports 19. The roller assembly 33 and conveyor belt 20 are encircled by padding 21 that is enclosed by a cover 22. See FIGS. 5-11. Advantageously, the cover 22 may be removable so that it can be more easily maintained or matched to a user's preferences or decor. The cover 22 may be made from a variety of suitable materials known in the arts and a variety of means of attaching the cover are also known in the arts. For example, the cover may be made from upholstery or waterproof fabric and attached by buttons, snaps, zippers, hook and loop fasteners, or other suitable fasteners.

Similarly, the padding 21 can be removed so that it may be easily replaced as needed or desired. Preferred padding comprises material that at least partially insulates a user from feeling the roller assembly when sitting in a chair that has the invention installed in it. This insulating effect can be achieved by using a sufficiently thick material or a combination of materials of varying thicknesses from which the padding is made. A variety of suitable means of attaching the padding 21 to the seat component 29 are known in the arts.

It is preferred that the lateral widths of the conveyor belt 20, padding 21, and cover 22 are slightly less than the seat width of the chair into which the invention is to be installed so that the invention is able to operate smoothly and as desired but without causing undesirable gaps between the installed seat and the interior sides of the chair.

A preferred embodiment of the roller assembly 33 is illustrated in FIGS. 8-11. Those of skill in the art will recognize that a variety of roller assemblies can be constructed and will function as described herein. For example, various parts of the roller assembly 33 can be formed into a single piece that performs the functions of the individual parts. It should be understood that the invention encompasses such variations as long as the assembled seat functions as described. For clarity and to better describe the invention, the preferred embodiment is used to illustrate the separate parts and their various functions.

Preferably, the roller assembly 33 includes two drive (or power) rollers 1 that are separately mounted onto a roller axle 12, a neutral roller 2, a tension adjustment roller 3, a first chain sprocket 17, a second chain sprocket 18, and an electric motor 7. The two drive rollers 1 are separated (i.e. spaced apart on the roller axle 12) from each other, and a drive chain 16 that loops around the first chain sprocket 17 that is inserted onto the portion of the roller axle 12 that is between the two drive rollers 1. The drive chain 16 also loops around the second chain sprocket 18 that is attached to the electric motor 7. Preferably the electric motor is an electric gear reduction motor or an analogous motor.

When the electric motor 7 is operated, it causes the second chain sprocket 18 to turn, which in turns causes the drive chain 16 to move and the first chain sprocket 17 to turn and cause the drive rollers 1 to rotate. When the drive rollers 1 rotate, the neutral roller 2 and tension adjustment roller 3 also rotate and cause the conveyor belt 20 and the seat component 29 to also move. The seat component 29 may be moved either forward or back as the operator chooses. Preferred controls 32 allow the electric motor 7 to turn the second chain sprocket 18 either forward or backward so that the seat component 29 is moved either forward or backward so that a user is moved either toward the front of the chair or toward the back of the chair. Preferred controls 32 allow the seat component 29 to be moved incrementally so that a user can move to positions between the most forward position and the most rearward position as the user desires.

The drive rollers 1, neutral roller 2, and tension adjustment roller 3 are held in place relative to each other by two, laterally placed, framing supports 19. Each framing support 19 comprises an adjustable mount 4 and a side mount 5 that includes a variety of openings into which the ends of the axles of the various rollers can be inserted. Each adjustable mount 4 is attached to the proximal end of the tension adjustment roller 3 and the proximal side mount 5. Each side mount 5 is also attached to the proximal end of the nearest drive roller 1 and the proximal end of the neutral roller 2.

Those of skill in the art will appreciate that a powered seat of the invention would likely need to be adjusted during installation and periodically thereafter so that the appropriate amount of tension is present to allow the roller assembly 33 and seat component 29 to operate as intended. The necessary amount of tension needed to operate the invention will depend in part upon the type of chair into which the invention is installed, the user(s), and the wear to the invention over time.

To allow the invention to operate smoothly and improve its longevity, roller bearings 13 are installed between the side mounts 5 and the respective ends of the drive rollers 1 and the neutral roller 2. In addition, to improve rigidity the side mounts 5 are also attached to a main frame 6 that is preferably located between the drive rollers 1 and the neutral roller 2 and above the tension adjustment roller 3. Those of skill in the art will appreciate that some variation in the relative locations of the different rollers can occur and still the same or similar result with the invention.

To assist with the desired placement of the electric motor 7 relative to the main frame 6, a motor mount(s) 14 and a motor mount adjustment plate(s) 15 can be used. Those of skill in the art will appreciate that a variety of motor mounts and adjustment plates exist and are readily available. The specific choices of motor mounts and adjustment plates will depend, at least in part, upon the specific electric motor that is use, the size of the chair seat, and available space into which the invention is to be installed.

An advantage of the preferred placement of the main frame 6 is that a slide plate 9 can be located above the main frame 6 and the drive rollers 1 and the neutral roller 2. Preferably, this slide plate 9 is elevated sufficiently above the rollers so that a user does not feel the rollers when the invention is operated. The inventor has found that placing springs 10 between the main frame 6 and the slide plate 9 achieves this desired result. The springs 10 are held in place by fasteners 8 (e.g. bolts) and retainer nuts 11.

Unless defined otherwise, all technical and scientific terms used herein have the same meaning as is commonly understood by one of skill in the art to which this invention belongs at the time of filing. Terminology used herein is for the purpose of describing particular embodiments of the invention and is not intended to be limiting. The meaning and scope of terms should be clear; however, in the event of any latent ambiguity, definitions provided herein take precedent over any dictionary or extrinsic definition. Further, unless otherwise required by context, singular terms shall include pluralities and plural terms shall include the singular unless the content clearly dictates otherwise. Herein, the use of "or" means "and/or" unless stated otherwise. Furthermore, the use of the term "including", as well as other forms such as "includes" and "included" is not limiting. As used herein, "each" refers to each member of a set or each member of a subset of a set.

What is claimed is:

1. A powered seat comprising a. a seat component that includes a roller assembly, a conveyor belt, and a padding, wherein the roller assembly includes two drive rollers, a roller axle, a neutral roller, a tension adjustment roller, a first chain sprocket, a second chain sprocket, a drive chain, and a motor;

b. two framing supports, wherein each framing support includes an adjustable mount and a side mount that has multiple openings;

c. at least two connectors for a chair such that the two connectors attach the two framing supports to the chair and the seat component to the two framing supports;

d. a power source, wherein the power source is a battery or an electrical cord; and e. a controller that operates the power source to move the seat component.

2. The powered seat of claim 1, wherein the power source is incorporated into the motor.

3. The powered seat of claim 1 further comprising a frame, wherein the frame includes two or more support brackets and at least two cross braces.

4. The powered seat of claim 3, wherein the frame further includes at least two legs.

5. The powered seat of claim 3, wherein the frame further includes at least one back member.

6. The powered seat of claim 1, wherein the padding has a cover.

7. The powered seat of claim 1 further comprising two or more roller bearings, a main frame, a motor mount, and a motor mount adjustment plate.

8. The powered seat of claim 7 further comprising a slide plate, two or more springs, and two or more fasteners.

9. A method of assembling a powered seat for a chair comprising a. assembling a roller assembly, wherein the roller assembly includes two drive rollers, a roller axle, a neutral roller, a tension adjustment roller, a first chain sprocket, a second chain sprocket, a drive chain, and a motor, by mounting the two drive rollers and the first chain sprocket onto the roller axle such that the drive rollers are spaced apart from each other, the first chain sprocket is between the drive rollers, and the drive chain engages with the first chain sprocket and loops around the roller axle and engages with the second chain sprocket that is attached to the motor;

b. attaching a framing support to each lateral side of the roller assembly, wherein each framing support includes an adjustable mount and a side mount that has multiple openings, such that each adjustable mount is attached to a proximal end of the tension adjustment roller and the proximal side mount, and each side mount is also attached to the proximal end of the nearest drive roller and the proximal end of the neutral roller;

c. assembling a seat component that includes the roller assembly that is attached to the framing support, a conveyor belt, a padding, and a cover such that the cover encloses the padding, and the padding encircles the conveyor belt, and the conveyor belt encircles the roller assembly;

d. attaching at least one connector to each interior, lateral side of a chair;

e. attaching the seat component to the connectors; and f. attaching a power source to the chair or seat component such that the power source is operated by a controller.

10. The method of claim 9 further comprising assembling a frame, wherein the frame includes two or more support brackets and at least two cross braces, and attaching the frame to the seat component and connectors.

11. The method of claim 10, wherein the frame further includes at least two legs and a back member.

12. A kit comprising a powered seat, wherein the powered seat comprises a. a seat component that includes a roller assembly, a conveyor belt, and a padding, wherein the roller assembly includes two drive rollers, a roller axle, a neutral roller, a tension adjustment roller, a first chain sprocket, a second chain sprocket, a drive chain, and a motor;

b. two framing supports, wherein each framing support includes an adjustable mount and a side mount that has multiple openings;

c. at least two connectors for a chair, wherein the two connectors attach the two framing supports to the chair and the seat component to the two framing supports;

d. a power source, wherein the power source is a battery or an electrical cord that is connected to the seat component; and e. a controller to operate the power source and move the seat component.

13. The kit of claim 12, further comprising a frame, wherein the frame includes two or more support brackets and at least two cross braces.

14. The kit of claim 13, wherein the frame further includes at least two legs and a back member.

15. The kit of claim 12, wherein the padding has a cover.

16. The kit of claim 12 further comprising two or more roller bearings, a main frame, a motor mount, and a motor mount adjustment plate.

17. The kit of claim 16 further comprising a slide plate, two or more springs, and two or more fasteners.

* * * * *